United States Patent
Hu et al.

(10) Patent No.: US 8,516,545 B2
(45) Date of Patent: *Aug. 20, 2013

(54) METHOD AND SYSTEM FOR SESSION MODIFICATION

(75) Inventors: Huadong Hu, Shenzhen (CN); Chunxia Zhi, Shenzhen (CN); Yali Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/293,925

(22) Filed: Nov. 10, 2011

(65) Prior Publication Data

US 2012/0059942 A1 Mar. 8, 2012

Related U.S. Application Data

(63) Continuation of application No. 12/728,026, filed on Mar. 19, 2010, which is a continuation of application No. PCT/CN2008/072267, filed on Sep. 4, 2008.

(30) Foreign Application Priority Data

Sep. 19, 2007 (CN) .......................... 2007 1 0154146

(51) Int. Cl.
*H04L 29/06* (2006.01)
(52) U.S. Cl.
USPC ............... 726/1; 726/2; 726/3; 455/432.1
(58) Field of Classification Search
USPC .............. 726/1–3; 705/38; 455/432.1, 432.2
See application file for complete search history.

(56) References Cited

U.S. PATENT DOCUMENTS

| 8,131,831 | B1 | 3/2012 | Hu | |
| 2008/0046963 | A1* | 2/2008 | Grayson et al. | 726/1 |
| 2008/0229385 | A1* | 9/2008 | Feder et al. | 726/1 |
| 2009/0047947 | A1 | 2/2009 | Giaretta et al. | |

(Continued)

FOREIGN PATENT DOCUMENTS

| CN | 1798041 A | 7/2006 |
| CN | 101001402 A | 7/2007 |

(Continued)

OTHER PUBLICATIONS

3GPP TS 23.203 V7.3.0, 3rd Generation Partnership Project, Technical Specification Group Services and System Aspects; Policy and charging control architecture (Release 7), dated Jun. 2007, total 72 pages.

(Continued)

*Primary Examiner* — Justin T Darrow
(74) *Attorney, Agent, or Firm* — Slater & Matsil, L.L.P.

(57) ABSTRACT

A method and system for session modification are provided. The method includes these steps: A home policy and charging rules function (h-PCRF) sends a policy and charging control (PCC) rule providing message to a policy and charging enforcement function (PCEF) b according to a received PCC rule request message, an application layer service message, or an h-PCRF self-trigger event; and the h-PCRF sends a PCC rule providing message to the PCEF a according to a PCC rule response message received from the PCEF b. With this present disclosure, session modification may be implemented when two or more PCEFs are included in the PCC architecture of a system architecture evolution (SAE) system.

27 Claims, 13 Drawing Sheets

(56) References Cited

U.S. PATENT DOCUMENTS

| | | |
|---|---|---|
| 2010/0146596 A1 | 6/2010 | Stenfelt et al. |
| 2010/0154029 A1 | 6/2010 | Fernandez et al. |
| 2010/0169950 A1 | 7/2010 | Matti et al. |
| 2010/0263017 A1 | 10/2010 | Matti et al. |
| 2012/0216249 A1 | 8/2012 | Fernandez et al. |

FOREIGN PATENT DOCUMENTS

| | | |
|---|---|---|
| EP | 1770915 A1 | 4/2007 |
| EP | 1988680 | 11/2008 |
| WO | 03049371 A1 | 6/2003 |
| WO | 2004034591 A2 | 4/2004 |
| WO | 2005104519 A1 | 11/2005 |
| WO | 2007097670 A1 | 8/2007 |

OTHER PUBLICATIONS

PCT publication and International search report for International application No. PCT/CN2008/072267, dated Dec. 18, 2008, total 33 pages.

English Translation of the Written Opinion of the International Search Authority for International application No. PCT/CN2008/072267, dated Dec. 18, total 5 pages.

Chinese office action for Chinese application No. 200880004141.3, dated Jul. 21, 2011, and an English translation thereof, total 12 pages.

First office action issued in corresponding U.S. Appl. No. 12/728,026, dated Aug. 2, 2012, 41 pages total.

Office Action received in U.S. Appl. No. 12/728,026 mailed May 2, 2013, 30 pages.

\* cited by examiner

METHOD AND SYSTEM FOR SESSION MODIFICATION

CROSS-REFERENCE TO RELATED APPLICATIONS

This application is a continuation of U.S. patent application Ser. No. 12/728,026, filed on Mar. 19, 2010, which is a continuation of International Application No. PCT/CN2008/072267, filed on Sep. 4, 2008, which claims priority to Chinese Patent Application No. 200710154146.1, filed on Sep. 19, 2007, both of which are hereby incorporated by reference in their entireties.

FIELD OF THE INVENTION

The present invention relates to communication technologies, and in particular, to an IP connectivity access network (IP-CAN) technology.

BACKGROUND OF THE INVENTION

In a Third Generation Partnership Project (3GPP) system, policy and charging functions are implemented by a policy and charging control (PCC) architecture.

The PCC architecture mainly enforces policy and charging control. As shown in FIG. 1, a PCC architecture in the prior art includes an application function (AF), a policy and charging rules function (PCRF), a subscription profile repository (SPR), a policy and charging enforcement function (PCEF), and an online charging system (OCS) or an offline charging system (OFCS).

The AF is adapted to provide access points for service applications and is connected to the PCRF through an Rx interface. Dynamic policy control needs to be performed on the network resources used by these service applications. During parameter negotiation on the service plane, the AF transfers relevant service information to the PCRF. If the service information is consistent with the policy rules defined on the PCRF by operators, the PCRF accepts the service parameters. Otherwise, the PCRF refuses the service parameters and may also carry acceptable service parameters in a response message. Then the AF may return these parameters to users.

The PCRF is adapted to generate policies and charging rules and is connected to the SPR through an Sp interface. As the core of the PCC system, the PCRF provides service data flow based network control rules, including data flow detection, gating, quality of service (QoS) control, and flow-based charging control. The PCRF sends the generated polices and charging rules to the PCEF through a Gx interface and the PCEF charges for service flows accordingly. The PCRF needs to generate policies and charging rules according to the relevant service information obtained from the AF, relevant user subscription data obtained from the SPR, and relevant bearer network information obtained from the PCEF. In addition, the PCRF needs to ensure that these rules are consistent with the user subscription data and to deliver trigger events to the PCEF so that the PCEF may actively request PCC rules from the PCRF when these trigger events occur.

The PCEF is adapted to: enforce the policies and charging rules generated by the PCRF on the bearer plane, receive trigger events delivered by the PCRF so as to actively request PCC rules from the PCRF when these trigger events occur, detect service data flows according to the traffic filter in the rules sent from the PCRF, control these service data flows according to the polices and charging rules generated by the PCRF, and charge for the service data flows online or offline. In online charging mode, the PCEF is connected to the OCS through a Gy interface and works with the OCS to complete credit management. The OCS includes a customized applications for mobile network enhanced logic service control point (CAMEL SCP) and a service data flow based credit control. In offline charging mode, the PCEF is connected to the OFCS through a Gz interface and exchanges relevant charging information with the OFCS. In general, the PCEF is located on a gateway (GW) in a network.

The SPR is adapted to store PCC-related user subscription data, including service information that can be used by users, QoS information that can be used by user services, charging-related user subscription data, and group types of users. The PCRF reads the information stored in the SPR through the Sp interface and performs policy control and charging based on user subscription data.

In the PCC architecture, IP-CAN session modification may be initiated by the PCEF. For example, the PCEF may initiate an IP-CAN session modification process when detecting an internal event of IP-CAN session modification caused by an operator's configuration or when detecting a bearer change during data transmission. IP-CAN session modification may also be initiated by the PCRF. For example, the PCRF may initiate an IP-CAN session modification process when the service information at the application layer on the AF changes, when the user subscription data stored in the SPR changes, or when an internal event occurs.

To ensure the competitiveness of the 3GPP system in the coming ten or more years, the 3GPP organization internally proposes system architecture evolution (SAE). In an SAE system, a new PPC architecture including multiple S7 or PCEF interface entities is adopted. In this PCC architecture, multiple S7 or PCEF interface entities are connected to the same PCRF at the same time for any IP-CAN session, which is beyond the capabilities of the PCC architecture in the prior art.

The new PCC architecture includes a roaming PCC architecture and a non-roaming PCC architecture.

FIG. 2 shows a non-roaming PCC architecture in the prior art. The non-roaming PCC architecture includes an AF in a packet data network (PDN), a home PCRF (h-PCRF), a home OCS (h-OCS), a PCEF a, and a PCEF b. The PCEF b is connected to the PDN, h-PCRF, h-OCS, and PCEF a through an SGi interface, an S7b interface, a Gyb interface, and a client mobility IP/proxy mobility IP (CMIP/PMIP) interface respectively. The PCEF a is connected to the h-PCRF and the PCEF b through an S7a interface and a CMIP/PMIP interface respectively. The h-PCRF is connected to the AF through an RX+ interface.

As shown in FIG. 2, the PCEF in the new PCC architecture is divided into two parts: PCEF a and PCEF b. The PCEF a may be configured on an IP access GW such as a serving GW, a PDN GW, or a core network (CN) entity. The PCEF b may be configured on a PDN GW or a CN entity. The bearer concept is not defined on the CMIP/PMIP interface between the PCEF a and the PCEF b. Thus, the bearer-related functions such as bearer binding are configured on the PCEF a. In addition, the SGi interface between the PCEF b and the PDN is a data transmission interface between the CN and the PDN. Thus, the charging and gating functions are configured on the PCEF b.

FIG. 3 shows a structure of a first roaming PCC architecture in the prior art. Different from the non-roaming PCC architecture shown in FIG. 2, the roaming PCC architecture further includes a visited PCRF (v-PCRF) and a visited OCS (v-OCS). As shown in FIG. 3, the PCEF b is connected to the PDN, h-PCRF, h-OCS, and PCEF a through an SGi interface, an S7b interface, a Gyb interface, and a CMIP/PMIP interface respectively. The PCEF a is connected to the v-PCRF and PCEF b through an S7a interface and a CMIP/PMIP interface respectively. The h-PCRF is connected to the AF and v-PCRF through an RX+ interface and an S9 interface respectively.

In the roaming PCC architecture, the PCEF b may be further divided into a PCEF b1 and a PCEF b2.

FIG. 4 shows a structure of a second roaming PCC architecture in the prior art. Different from the PCEF b in the first roaming PCC architecture shown in FIG. 3, the PCEF b in the second roaming PCC architecture further includes a PCEF b1 and a PCEF b2. As shown in FIG. 4, the PCEF b2 is connected to the PDN, h-PCRF, h-OCS, and PCEF b1 through an SGi interface, an S7b2 interface, a Gyb2 interface, and a CMIP/PMIP interface respectively. The PCEF a is connected to the v-PCRF and PCEF b1 through an S7a interface and a CMIP/PMIP interface respectively. The h-PCRF is connected to the AF and v-PCRF through an RX+ interface and an S9 interface respectively. The PCEF b1 is connected to the PCEF b2 and PCEF a through CMIP/PMIP interfaces respectively. In actual applications, the PCEF b1 may be also connected to the v-PCRF through an S7b1 interface.

The inventor of the present invention discovers that the PCEF in the PCC architecture of the SEA system in the prior art is divided into two parts. That is, the new PCC architecture includes two PCEFs and the PCEF that may perceive a bearer event does not support service data flow based charging. In this case, in online charging mode, it is impossible to ensure that all the PCC rules received by the PCEF that may perceive bearer events pass credit authorization.

SUMMARY OF THE INVENTION

Embodiments of the present invention provide a method and system for session modification to modify a session in a PCC architecture of an SAE system.

To realize the preceding objective, an embodiment of the present invention provides a method for session modification. The method includes:

sending, by a home policy and charging rules function, h-PCRF, a first policy and charging control, PCC, rule providing message to a policy and charging enforcement function, PCEF, b according to a received PCC rule request message, an application layer service message, or an h-PCRF self-trigger event; and sending, by the h-PCRF, a second PCC rule providing message to a PCEF a according to a PCC rule response message received from the PCEF b.

An embodiment of the present invention provides a method for transferring information. The method includes:

receiving, by a home policy and charging rules function, h-PCRF, a policy and charging control, PCC rule request message from a policy and charging enforcement function, PCEF a;

obtaining, by the h-PCRF, information of a trigger event that occurs on the PCEF a and information of affected PCC rules from the received PCC rule request message; and sending, by the h-PCRF, a PCC rule providing message to a PCEF b, where the PCC rule providing message comprises the information of the trigger event that occurs on the PCEF a.

An embodiment of the present invention provides a system for session modification. The system includes a PCEF a, a PCEF b, an AF, an h-OCS, and an h-PCRF, where:

the PCEF b is connected to the AF, h-PCRF, h-OCS, and PCEF a through an SGi interface, an S7b interface, a Gyb interface, and a CMIP/PMIP interface respectively;

the PCEF a is connected to the h-PCRF through an S7a interface;

the h-PCRF is connected to the AF through an RX+ interface;

the h-PCRF sends a PCC rule providing message to the PCEF b according to a received PCC rule request message, an application layer service message, or a self-trigger message; and the h-PCRF sends a PCC rule providing message to the PCEF a according to a PCC rule response message sent from the PCEF b.

In the technical solution of the present invention, when the PCC architecture of the SAE system includes two or more PCEFs, the h-PCRF sends a PCC rule providing message to the PCEF b according to the received PCC rule request message and determines whether to send a PCC rule providing message to the PCEF a according to a PCC rule response message sent from the PCEF b. This ensures that all the PCC rules received by the PCEF a pass credit authorization in online charging mode so that operators may easily perform PCC on service data flows.

BRIEF DESCRIPTION OF THE DRAWING(S)

DETAILED DESCRIPTION OF THE INVENTION

For better understanding of the objective, technical solution and merits of the present invention, the present invention is hereinafter described in detail with reference to accompanying drawings and exemplary embodiments.

Figure 1:
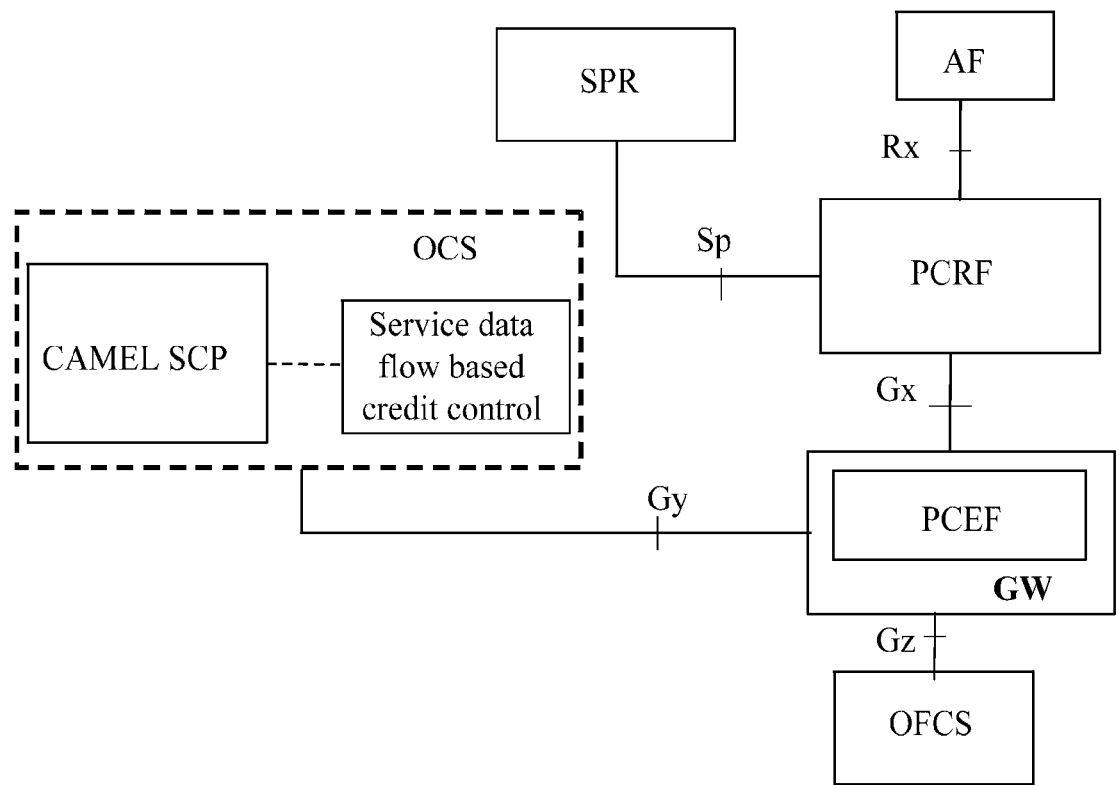
FIG. 1 shows a general PCC architecture in the prior art.
Figure 2:
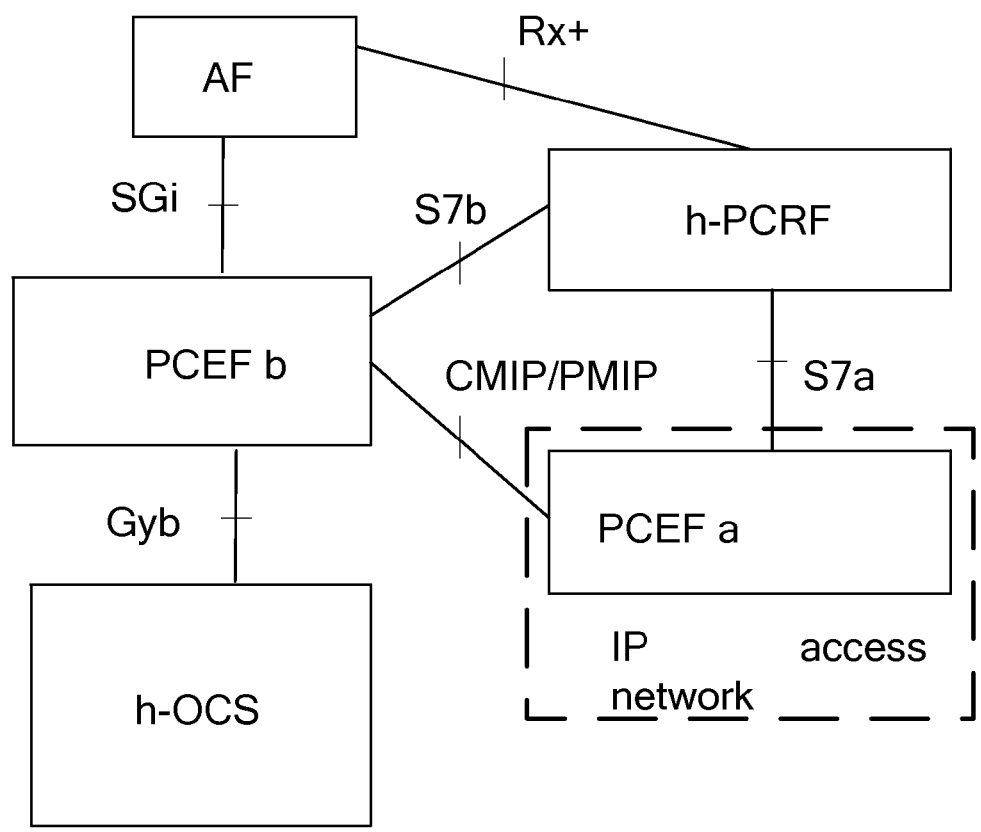
FIG. 2 shows a non-roaming PCC architecture in the prior art.

The first embodiment implements IP-CAN session modification and credit re-authorization based on a non-roaming PCC architecture shown in FIG. 2.

In the PCC architecture shown in FIG. 2, the PCEF a and PCEF b both receive a trigger event delivered from the h-PCRF. The PCEF a may receive a trigger event in one of the following modes:

the h-PCRF directly delivers the trigger event to the PCEF a; and the h-PCRF delivers the trigger event to the PCEF b, and then the PCEF b sends the bearer-related trigger event information to the PCEF a.

The h-OCS sends credit re-authorization events to only the PCEF b and no credit re-authorization event is available on the PCEF a.

Thus, when an event that occurs matches a trigger event, the PCEF a and PCEF b may both initiate an IP-CAN session modification process. When an event that occurs matches a credit re-authorization event, however, only the PCEF b initiates a credit re-authorization process.

The h-PCRF may send PCC rules to the PCEF a and PCEF b in one of the following modes:

A. PCC rules to be enforced are pre-configured on the PCEF a and PCEF b respectively. The h-PCRF sends the same PCC rules to the PCEF a and PCEF b. Then the PCEF a and PCEF b obtain their own PCC rules to be enforced from the received PCC rules according to their pre-configured PCC rule information.

B. The h-PCRF sends the same PCC rules to the PCEF a and PCEF b. The h-PCRF provides instructions for enforcing PCC rules for the PCEF a and PCEF b before or when providing PCC rules for the PCEF a and PCEF b. Then the PCEF a and PCEF b obtain their own PCC rules to be enforced according to the received enforcement instructions.

C. The h-PCRF generates different PCC rules for the PCEF a and PCEF b according to the functions of the PCEF a and PCEF b and sends corresponding PCC rules to the PCEF a and PCEF b respectively. Then the PCEF a and PCEF b directly enforce the received PCC rules.

The following describes the IP-CAN session modification process and the credit re-authorization process respectively.

When the h-PCRF directly delivers trigger events to the PCEF a, the PCEF a may perceive bearer-related events but the PCEF b may not because the bearer concept is not defined on the interface between the PCEF a and the PCEF b. The PCEF b, however, needs to perform credit re-authorization according to the bearer-related event that occurs. Thus, for the IP-CAN session modification process initiated by the PCEF a, the h-PCRF receives a PCC rule request message including the information of the trigger event that occurs and affected PCC rules from the PCEF a, generates new PCC rules, and then delivers the new PCC rules and the obtained information of the trigger event that occurs and affected PCC rules to the PCEF b, while giving an instruction indicating that trigger event information is used to match a credit re-authorization event. To indicate that trigger event information is used to match a credit re-authorization event, the h-PCRF may:

add a trigger event type that is only used to match a credit re-authorization event when delivering the trigger event to the PCEF b;

add a mark to the existing trigger event information to identify that the trigger event is used to update the trigger event stored on the PCEF b or match a credit re-authorization event; or use other methods. Then the PCEF b matches the received trigger event information for matching a credit re-authorization event from the h-PCRF with the stored credit re-authorization event and determines whether to perform credit re-authorization according to the matching result. If credit re-authorization is required, the PCEF b performs credit re-authorization on all the affected PCC rules received from the h-PCRF.

Figure 5A:
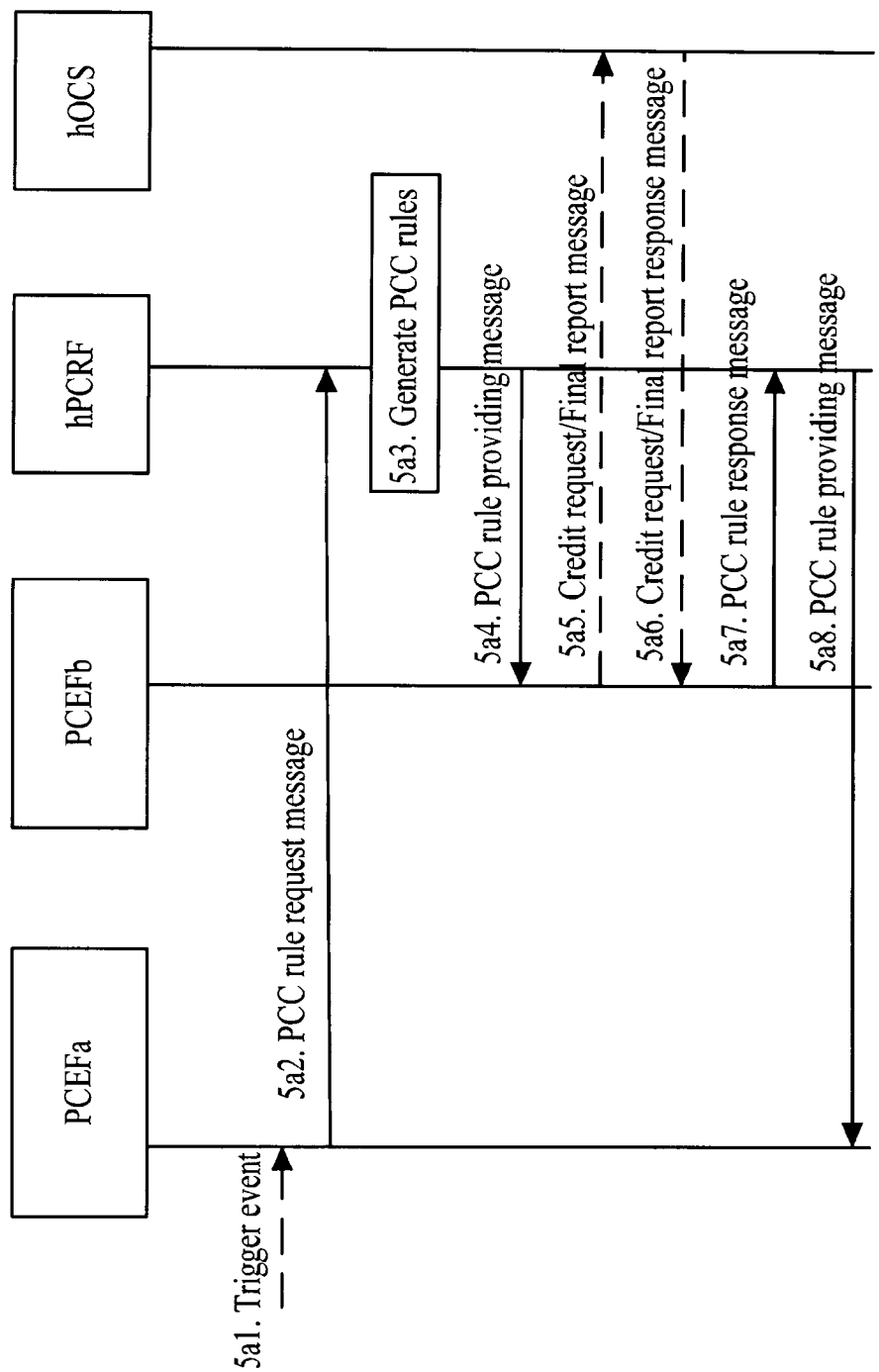
FIG. 5a is a flowchart showing that a PCEF a initiates an IP-CAN session modification process when an h-PCRF directly delivers a trigger event to the PCEF a in a first embodiment of the present invention.

FIG. 5a is a flowchart showing that a PCEF a initiates an IP-CAN session modification process when an h-PCRF directly delivers a trigger event to the PCEF a in the first embodiment of the present invention. The process includes the following steps:

Step 5a1: The PCEF a determines that an IP-CAN session modification process needs to be initiated to update PCC rules.

In this step, the PCEF a may determine whether to initiate an IP-CAN session modification process according to whether an event that matches the trigger event stored on the PCEF a or an internal trigger event occurs. The trigger event includes but is not limited to dedicated bearer setup, modification, and deletion initiated by a UE.

Step 5a2: The PCEF a sends a PCC rule request message to the h-PCRF.

In this step, the PCC rule request message carries update information required for the h-PCRF to make PCC decisions, information of a trigger event that occurs, and information of the PCC rules affected by the trigger event.

Step 5a3: The h-PCRF generates PCC rules.

When generating PCC rules, the h-PCRF may interact with the AF or the SPR to obtain the required application layer service information or subscription data information.

Step 5a4: The h-PCRF sends a PCC rule providing message to the PCEF b.

In this step, the PCC rule providing message may carry the obtained information of the trigger event and affected PCC rules from the PCEF a and an instruction indicating that trigger event information is used to match a credit re-authorization event.

Step 5a5 and step 5a6: In online charging mode, the PCEF b determines whether to initiate a credit re-authorization process according to stored credit re-authorization event information and trigger event information in the PCC rule providing message.

In this step, the PCEF b matches stored credit re-authorization event information with trigger event information in the PCC rule providing message. If the matching is successful, the PCEF b initiates a credit re-authorization process and performs credit re-authorization on all the affected PCC rules received from the h-PCRF.

Step 5a7: The PCEF b returns a PCC rule response message to the h-PCRF. The response message may carry the enforcement result information of the PCC rules. In online charging mode, the response message may also carry credit availability information.

Step 5a8: The h-PCRF sends a PCC rule providing message to the PCEF a according to the PCC rule response message sent from the PCEF b.

In online charging mode, the PCC rule response message sent from the PCEF b to the h-PCRF may also carry credit availability information. If the credit is available, the h-PCRF sends a PCC rule providing message to the PCEF a, carrying new PCC rules. If the credit is unavailable, the h-PCRF sends a PCC rule providing message to the PCEF a, without carrying the new PCC rules generated for the unavailable credit.

If the h-PCRF delivers a trigger event to the PCEF b, and then the PCEF b sends the bearer-related trigger event to the PCEF a, the PCEF a may also initiate an IP-CAN session modification process. In this case, after detecting the trigger event, the PCEF a sends the information of the trigger event and the information of the affected PCC rules to the PCEF b; the PCEF b sends the received information to the h-PCRF to request new PCC rules; after receiving the new PCC rules from the h-PCRF, the PCEF b determines whether to initiate a credit re-authorization process according to the information received from the PCEF a and the new PCC rules received from the h-PCRF.

Figure 5B:
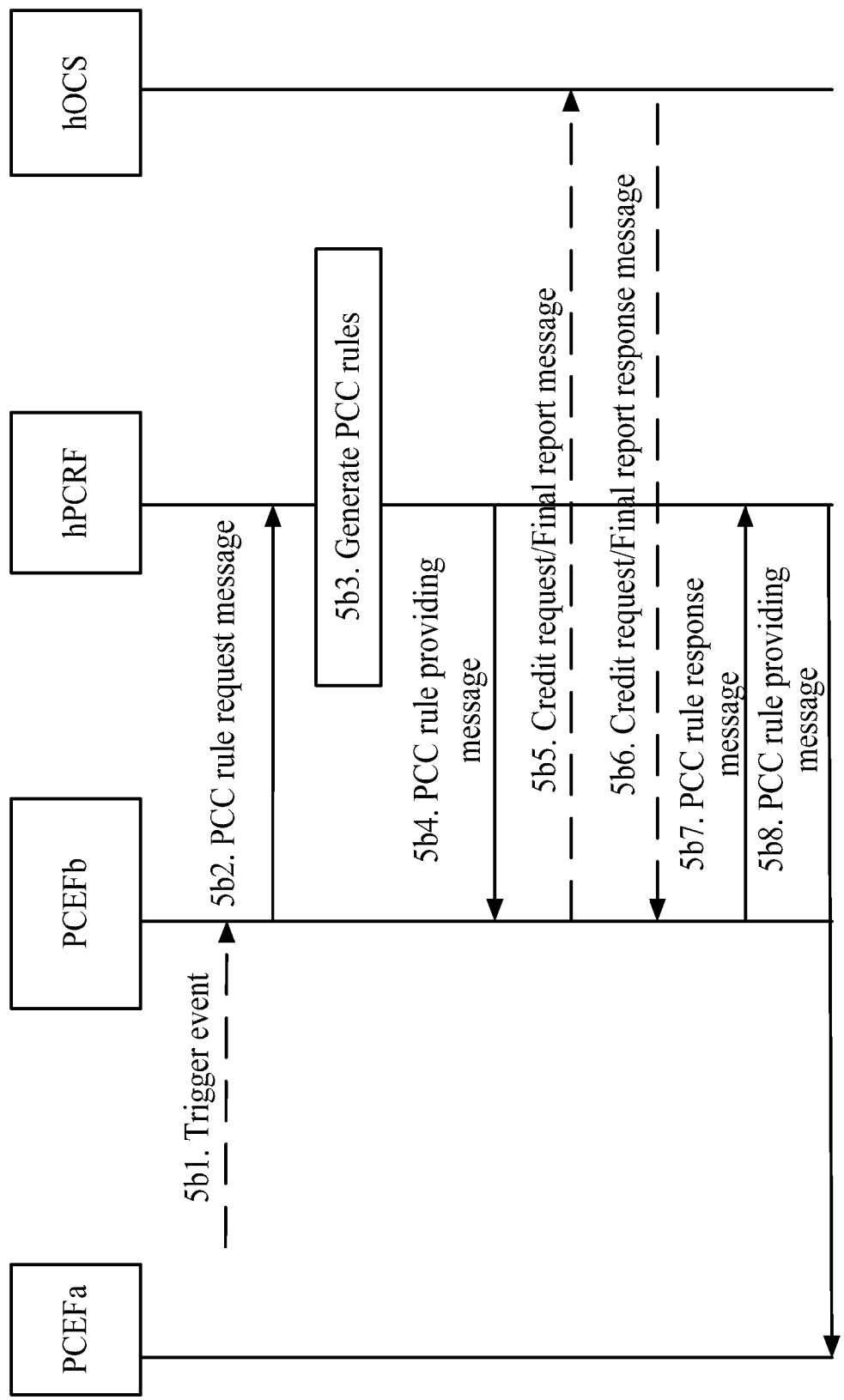
FIG. 5b is a flowchart showing that a PCEF b initiates an IP-CAN session modification process in the first embodiment of the present invention.

FIG. 5b is a flowchart showing that a PCEF b initiates an IP-CAN session modification process. The process is different from the IP-CAN session modification process shown in FIG. 5a. Specific differences are as follows:

In step 5b1, the PCEF b may determine whether to initiate an IP-CAN session modification process according to whether an event that matches the trigger event stored on the PCEF b or an internal trigger event occurs.

In step 5b2, the PCC rule request message sent from the PCEF b to the h-PCRF carries the update information required for the h-PCRF to make PCC decisions.

In step 5b4, the h-PCRF sends a PCC rule providing message to the PCEF b.

Figure 5C:
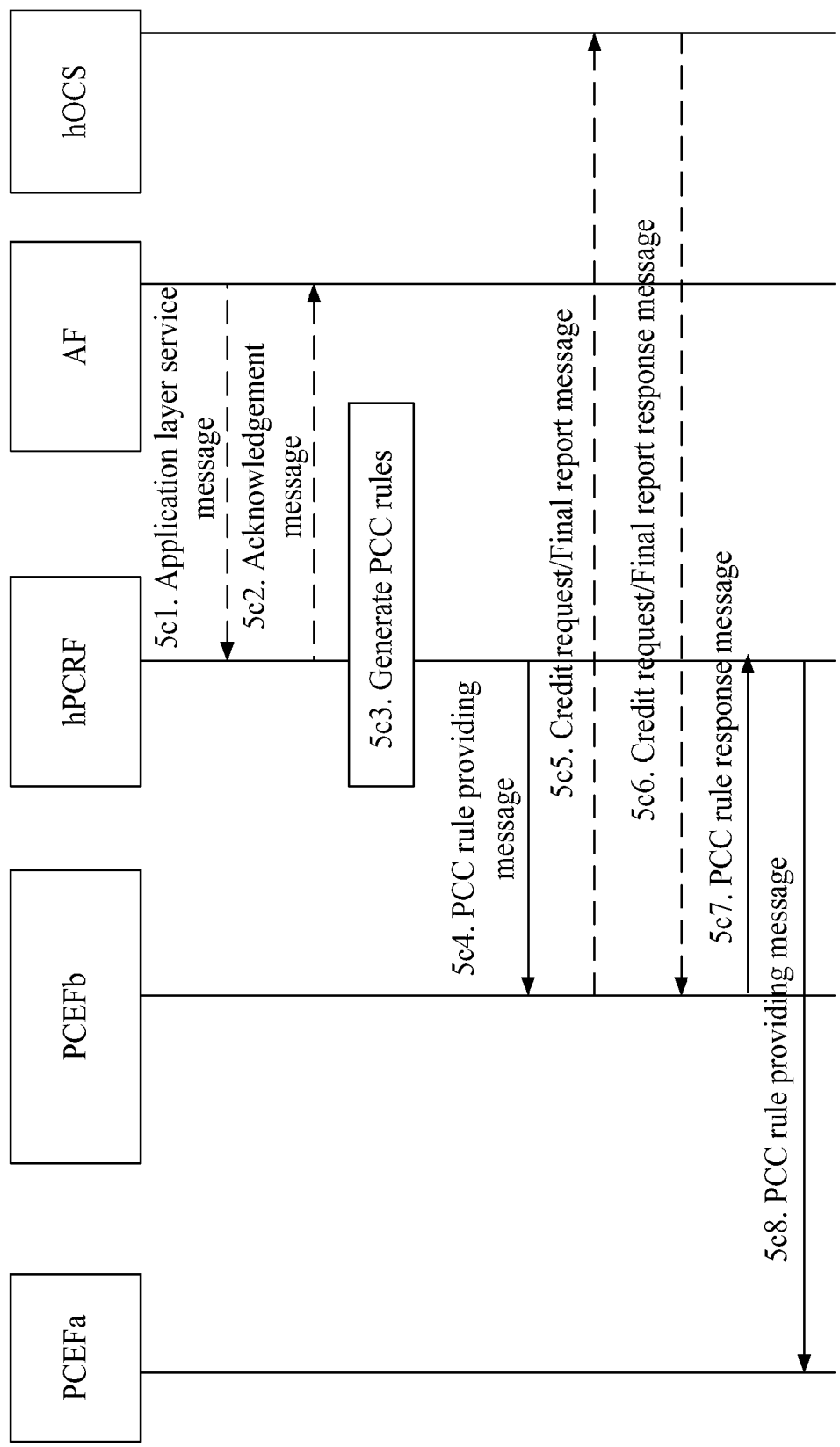
FIG. 5c is a flowchart showing that an h-PCRF initiates an IP-CAN session modification process in the first embodiment of the present invention.

FIG. 5c is a flowchart showing that an h-PCRF initiates an IP-CAN session modification process in the first embodiment of the present invention. The process includes the following steps:

Step 5c1: The AF sends an application layer service providing or modification message to the h-PCRF to trigger the h-PCRF to initiate an IP-CAN session modification process. The h-PCRF may also initiate an IP-CAN session modification process according to an internal trigger event.

Step 5c2: The h-PCRF returns an application layer service providing or modification acknowledgement message to the AF.

Step 5c3: The h-PCRF generates PCC rules.

Step 5c4: The h-PCRF sends a PCC rule providing message to the PCEF b.

Step 5c5 and step 5c6: In online charging mode, the PCEF b determines whether to initiate a credit re-authorization process according to credit re-authorization event information and trigger event information in the PCC rule providing message.

In this step, according to stored credit re-authorization event information and the PCC rule providing message, the PCEF b needs to request a new credit from the h-OCS for a new charging key. For an unavailable charging key, the PCEF b returns a final report and remaining credits to the h-OCS. Other events meeting credit re-authorization conditions may also trigger the PCEF b to request new credits from the h-OCS.

Step 5c7: The PCEF b returns a PCC rule response message to the h-PCRF. The response message may carry the enforcement result information of the PCC rules. In online charging mode, the response message may also carry credit availability information.

Step 5c8: The h-PCRF sends a PCC rule providing message to the PCEF a according to the PCC rule response message sent from the PCEF b.

In online charging mode, the PCC rule response message sent from the PCEF b to the h-PCRF may also carry credit availability information. If the credit is available, the h-PCRF sends a PCC rule providing message to the PCEF a, carrying new PCC rules. If the credit is unavailable, the h-PCRF sends a PCC rule providing message to the PCEF a, without carrying the new PCC rules generated for the unavailable credit.

Figure 3:
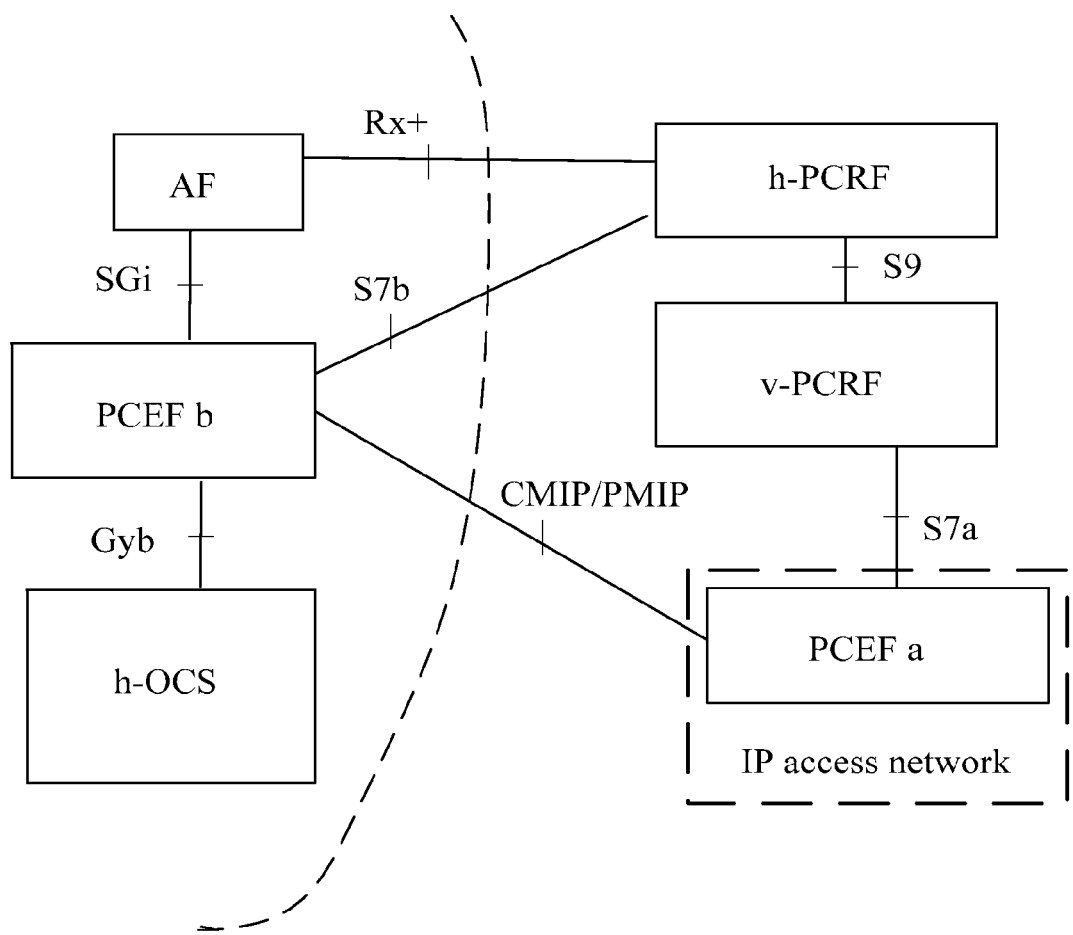
FIG. 3 shows a first roaming PCC architecture in the prior art.

The second embodiment implements IP-CAN session modification and credit re-authorization based on a roaming PCC architecture shown in FIG. 3.

In the PCC architecture shown in FIG. 3, the PCEF a and PCEF b both receive the trigger event delivered from the h-PCRF. The PCEF a may receive a trigger event in one of the following modes:

the h-PCRF directly sends the trigger event to the PCEF a; and the h-PCRF sends the trigger event to the PCEF b, and then the PCEF b sends the bearer-related trigger event information to the PCEF a.

The h-OCS sends credit re-authorization events to only the PCEF b and no credit re-authorization event is available on the PCEF a.

Thus, when an event that occurs matches a trigger event, the PCEF a and PCEF b both may initiate an IP-CAN session modification process. When an event that occurs matches a credit re-authorization event, however, only the PCEF b initiates a credit re-authorization process.

In this embodiment, the h-PCRF may send PCC rules to the PCEF a and PCEF b in three modes, which is similar to the first embodiment and is not further described.

The following describes the IP-CAN session modification process and the credit re-authorization process respectively.

If the h-PCRF sends a trigger event to the PCEF a through a v-PCRF, the PCEF a initiates an IP-CAN session modification process. In this case, the h-PCRF receives a PCC rule request message including the information of the trigger event that occurs and affected PCC rules from the PCEF a through the v-PCRF, generates new PCC rules, and then delivers the new PCC rules and the obtained information of the trigger event that occurs and affected PCC rules to the PCEF b, while giving an instruction indicating that trigger event information is used to match a credit re-authorization event. To indicate that trigger event information is used to match a credit re-authorization event, the h-PCRF may:

add a trigger event type that is only used to match a credit re-authorization event when delivering the trigger event to the PCEF b;

add a mark to the existing trigger event information to identify that the trigger event is used to update the trigger event stored on the PCEF b or match a credit re-authorization event; or use other methods.

Then the PCEF b matches the received trigger event information for matching a credit re-authorization event from the h-PCRF with the stored credit re-authorization event and determines whether to perform credit re-authorization according to the matching result. If credit re-authorization is required, the PCEF b performs credit re-authorization on all the affected PCC rules received from the h-PCRF.

Figure 6A:
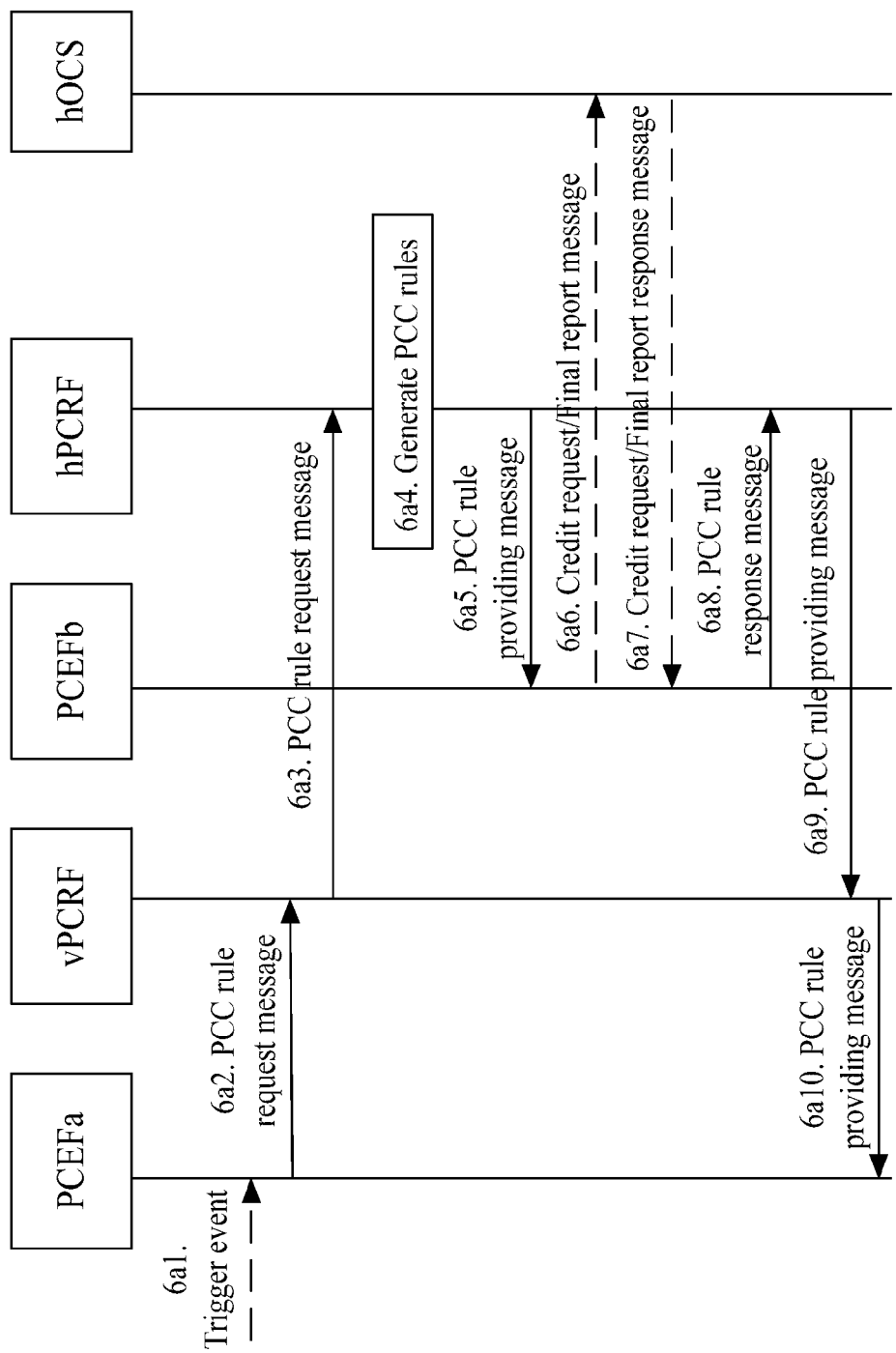
FIG. 6a is a flowchart showing that a PCEF a initiates an IP-CAN session modification process when an h-PCRF delivers a trigger event to the PCEF a through a v-PCRF in a second embodiment of the present invention.

FIG. 6a is a flowchart showing that a PCEF a initiates an IP-CAN session modification process when an h-PCRF delivers a trigger event to the PCEF a through a v-PCRF in the second embodiment of the present invention. The process includes the following steps:

Step 6a1: The PCEF a determines that an IP-CAN session modification process needs to be initiated to update PCC rules.

In this step, the PCEF a may determine whether to initiate an IP-CAN session modification process according to whether an event that matches the trigger event stored on the PCEF a or an internal trigger event occurs. The trigger event includes but is not limited to dedicated bearer setup, modification, and deletion initiated by a UE.

Step 6a2: The PCEF a sends a PCC rule request message to the v-PCRF, carrying the update information required for the h-PCRF to make PCC decisions.

Step 6a3: The v-PCRF forwards the PCC rule request message received from the PCEF a.

Step 6a4: The h-PCRF generates PCC rules.

When generating PCC rules, the h-PCRF may interact with the AF or the SPR to obtain the required application layer service information or subscription data information.

Step 6a5: The h-PCRF sends a PCC rule providing message to the PCEF b.

In this step, when sending the PCC rule providing message to the PCEF b, the h-PCRF may also provide the received trigger event information and the information of the affected PCC rules from the PCEF a for the PCEF b, while giving an instruction indicating that trigger event information is used to match a credit re-authorization event.

Step 6a6 and step 6a7: In online charging mode, the PCEF b determines whether to initiate a credit re-authorization process according to stored credit re-authorization event information and trigger event information in the PCC rule providing message.

In this step, the PCEF b matches stored credit re-authorization event information with trigger event information in the PCC rule providing message. If the matching is successful, the PCEF b initiates a credit re-authorization process and performs credit re-authorization on all the affected PCC rules received from the h-PCRF.

Step 6a8: The PCEF b returns a PCC rule response message to the h-PCRF. The response message may carry the enforcement result information of the PCC rules. In online charging mode, the response message may also carry credit availability information.

Step 6a9: The h-PCRF sends a PCC rule providing message to the v-PCRF according to the PCC rule response message sent from the PCEF b.

In online charging mode, the PCC rule response message sent from the PCEF b to the h-PCRF may also carry credit availability information. If the credit is available, the h-PCRF sends a PCC rule providing message to the PCEF a, carrying new PCC rules. If the credit is unavailable, the h-PCRF sends a PCC rule providing message to the PCEF a, without carrying the new PCC rules generated for the unavailable credit.

Step 6a10: The v-PCRF sends a PCC rule providing message to the PCEF a.

In this step, the v-PCRF may or may not process the received PCC rule providing message according to local policies.

If the h-PCRF delivers a trigger event to the PCEF b and then the PCEF b sends the bearer-related trigger event to the PCEF a, the PCEF a may also initiate an IP-CAN session modification process. In this case, after detecting the trigger event, the PCEF a sends the information of the trigger event and the information of the affected PCC rules to the PCEF b; the PCEF b sends the received information to the h-PCRF to request new PCC rules; after receiving the new PCC rules from the h-PCRF, the PCEF b determines whether to initiate a credit re-authorization process according to the information received from the PCEF a and the new PCC rules received from the h-PCRF.

Figure 6B:
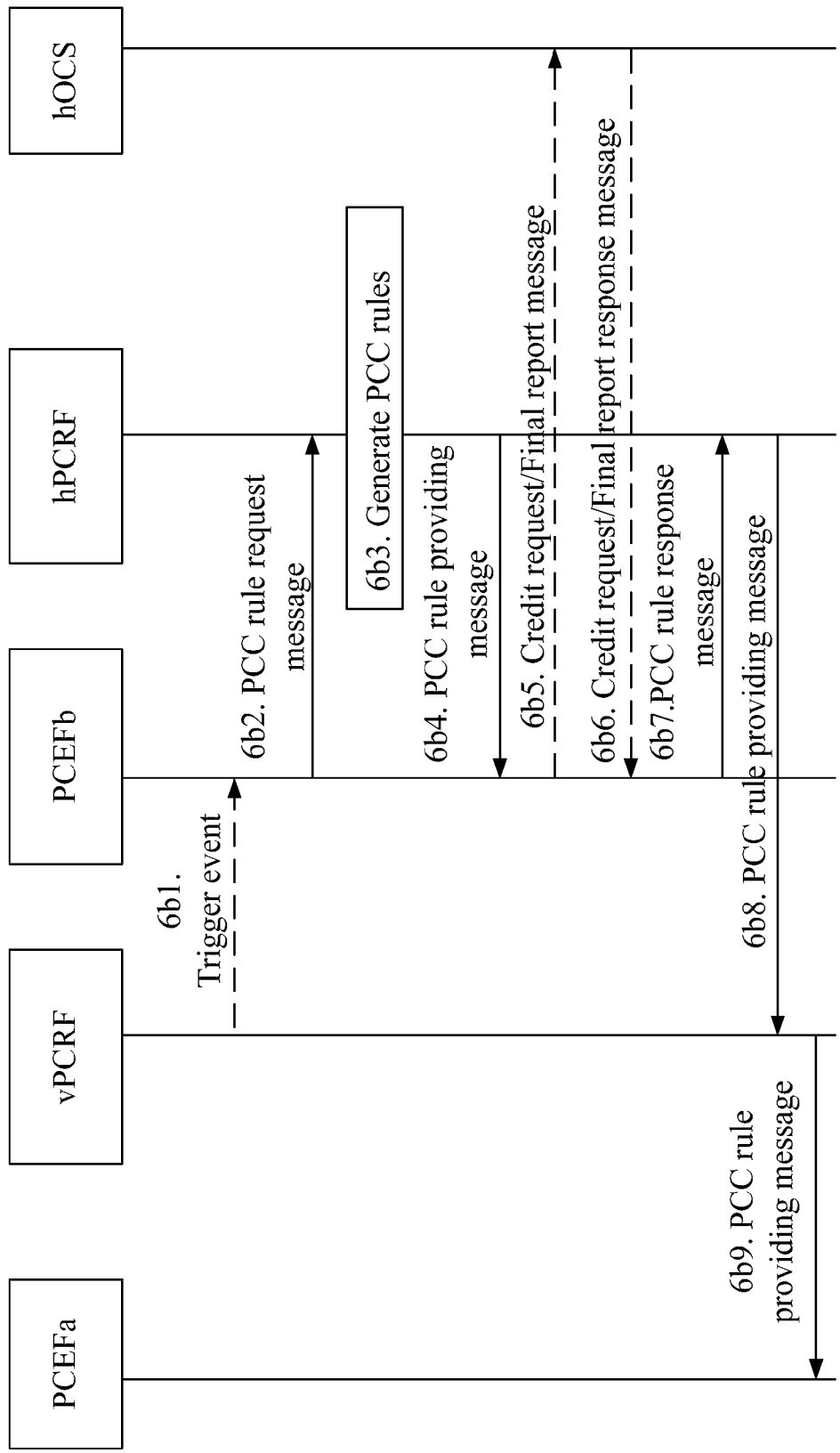
FIG. 6b is a flowchart showing that a PCEF b initiates an IP-CAN session modification process in the second embodiment of the present invention.

FIG. 6b is a flowchart showing that a PCEF b initiates an IP-CAN session modification process in the second embodiment of the present invention. The process includes the following steps:

Step 6b1: The PCEF b determines that an IP-CAN session modification process needs to be initiated to update PCC rules.

In this step, the PCEF b may determine whether to initiate an IP-CAN session modification process according to whether an event that matches the trigger event stored on the PCEF b or an internal trigger event occurs.

Step 6b2: The PCEF b sends a PCC rule request message to the h-PCRF, carrying the update information required for the h-PCRF to make PCC decisions.

Step 6b3: The h-PCRF generates PCC rules.

When generating PCC rules, the h-PCRF may interact with the AF or the SPR to obtain the required application layer service information or subscription data information.

Step 6b4: The h-PCRF sends a PCC rule providing message to the PCEF b.

Step 6b5 and step 6b6: In online charging mode, the PCEF b determines whether to initiate a credit re-authorization process according to credit re-authorization event information and trigger event information in the PCC rule providing message.

In this step, according to stored credit re-authorization event information and the PCC rule providing message, the PCEF b needs to request a new credit from the h-OCS for a new charging key. For an unavailable charging key, the PCEF b returns a final report and remaining credits to the h-OCS. Other events meeting credit re-authorization conditions may also trigger the PCEF b to request new credits from the h-OCS.

Step 6b7: The PCEF b returns a PCC rule response message to the h-PCRF. The response message may carry the enforcement result information of the PCC rules. In online charging mode, the response message may also carry credit availability information.

Step 6b8: The h-PCRF sends a PCC rule providing message to the v-PCRF according to the PCC rule response message sent from the PCEF b.

In online charging mode, the PCC rule response message sent from the PCEF b to the h-PCRF may also carry credit availability information. If the credit is available, the h-PCRF sends a PCC rule providing message to the PCEF a, carrying new PCC rules. If the credit is unavailable, the h-PCRF sends a PCC rule providing message to the PCEF a, without carrying the new PCC rules generated for the unavailable credit.

Step 6b9: The v-PCRF sends a PCC rule providing message to the PCEF a.

In this step, the v-PCRF may or may not process the received PCC rule providing message according to local policies.

Figure 6C:
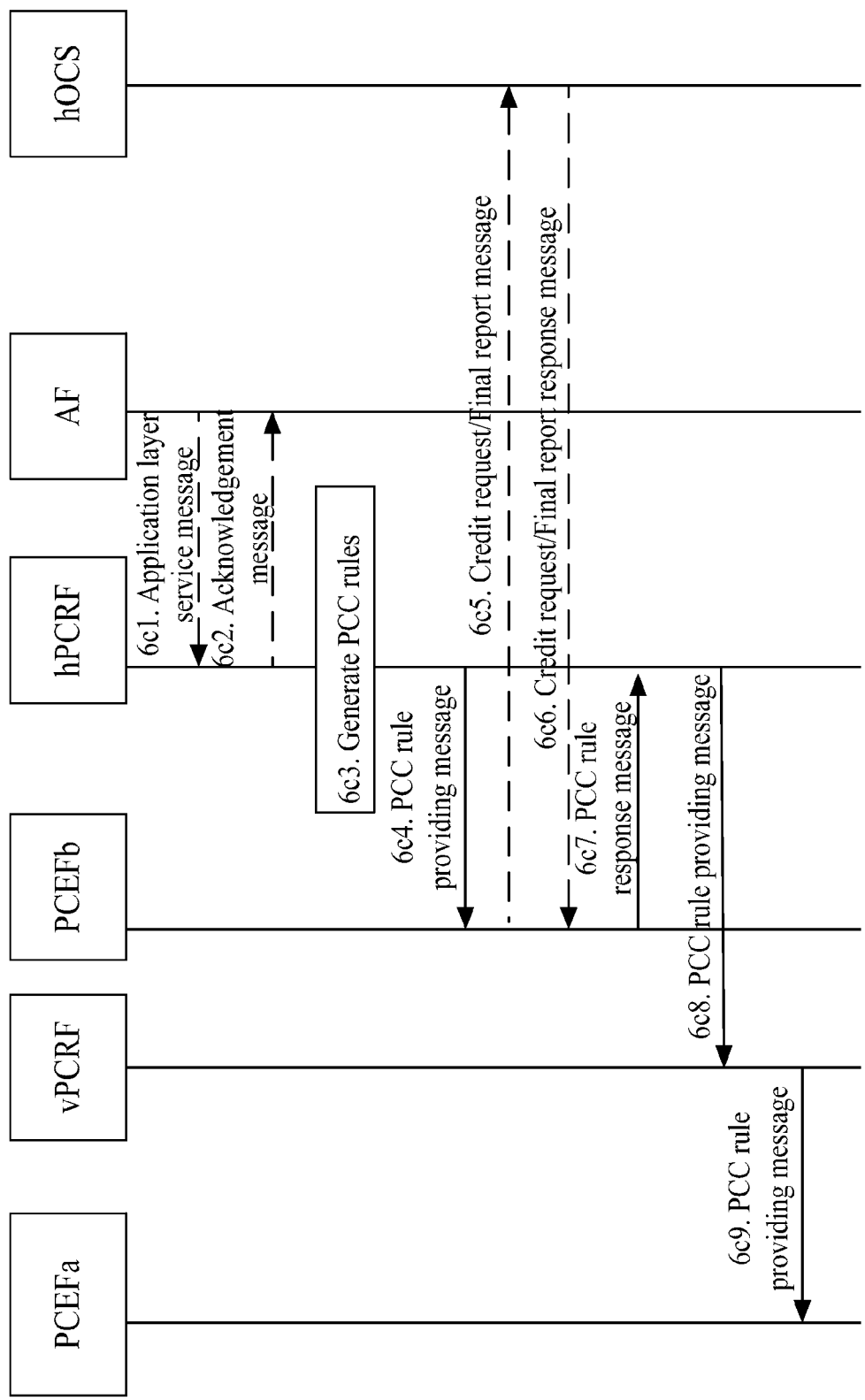
FIG. 6c is a flowchart showing that an h-PCRF initiates an IP-CAN session modification process in the second embodiment of the present invention.

FIG. 6c is a flowchart showing that an h-PCRF initiates an IP-CAN session modification process in the second embodiment of the present invention. The process includes the following steps:

Step 6c1: The AF sends an application layer service providing or modification message to the h-PCRF to trigger the h-PCRF to initiate an IP-CAN session modification process. The h-PCRF may also initiate an IP-CAN session modification process according to an internal trigger event.

Step 6c2: The h-PCRF returns an application layer service providing or modification acknowledgement message to the AF.

Step 6c3: The h-PCRF generates PCC rules.

Step 6c4: The h-PCRF sends a PCC rule providing message to the PCEF b.

Step 6c5 and step 6c6: In online charging mode, the PCEF b determines whether to initiate a credit re-authorization process according to credit re-authorization event information and trigger event information in the PCC rule providing message.

In this step, according to stored credit re-authorization event information and the PCC rule providing message, the PCEF b needs to request a new credit from the h-OCS for a new charging key. For an unavailable charging key, the PCEF b returns a final report and remaining credits to the h-OCS. Other events meeting credit re-authorization conditions may also trigger the PCEF b to request new credits from the h-OCS.

Step 6c7: The PCEF b returns a PCC rule response message to the h-PCRF. The response message may carry the enforcement result information of the PCC rules. In online charging mode, the response message may also carry credit availability information.

Step 6c8: The h-PCRF sends a PCC rule providing message to the v-PCRF according to the PCC rule response message sent from the PCEF b.

In online charging mode, the PCC rule response message sent from the PCEF b to the h-PCRF may also carry credit availability information. If the credit is available, the h-PCRF sends a PCC rule providing message to the PCEF a, carrying new PCC rules. If the credit is unavailable, the h-PCRF sends a PCC rule providing message to the PCEF a, without carrying the new PCC rules generated for the unavailable credit.

Step 6c9: The v-PCRF sends a PCC rule providing message to the PCEF a.

In this step, the v-PCRF may or may not process the received PCC rule providing message according to local policies.

Figure 4:
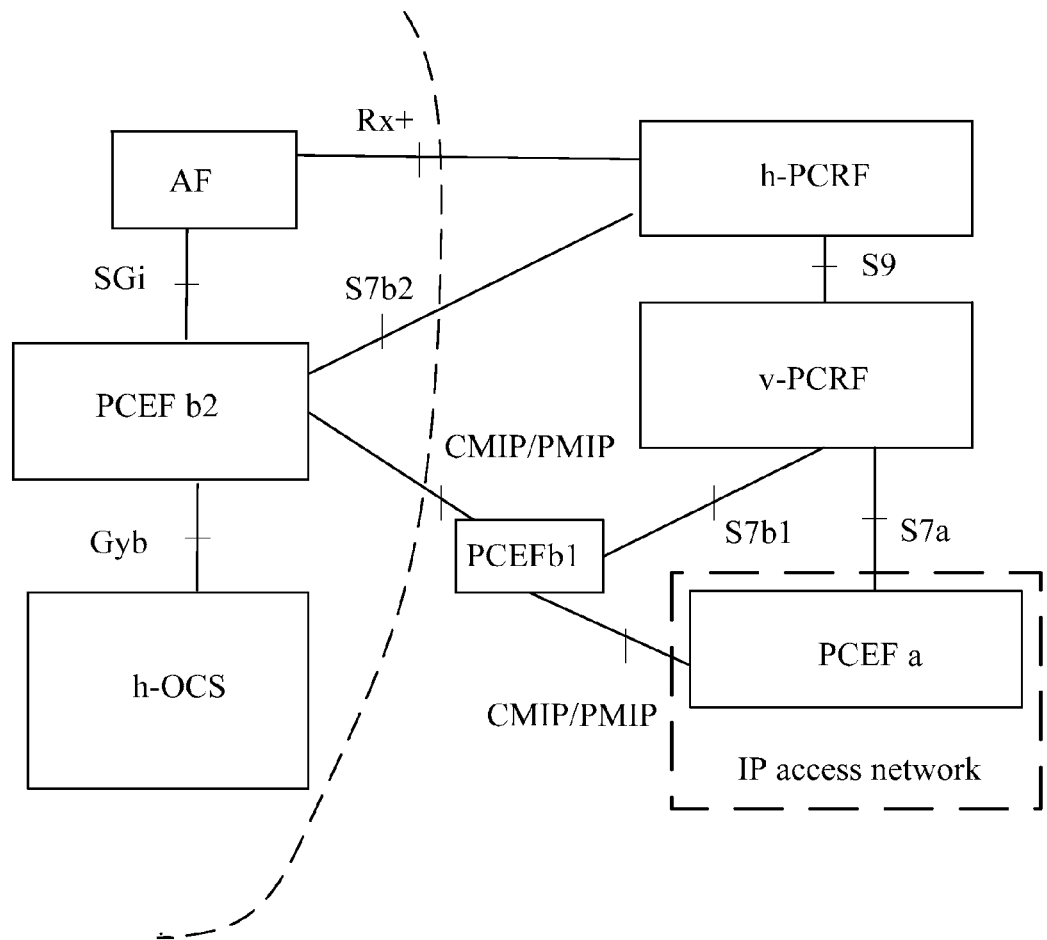
FIG. 4 shows a second roaming PCC architecture in the prior art.

The third embodiment implements IP-CAN session modification and credit re-authorization based on a roaming PCC architecture shown in FIG. 4.

As shown in FIG. 4, the PCEF a, PCEF b1, and PCEF b2 receive the trigger events delivered from the h-PCRF respectively. The h-PCRF may deliver the trigger events to the PCEF a through the v-PCRF. The h-PCRF may also deliver the trigger events to the PCEF b2, and then the PCEF b2 sends the bearer-related trigger events to the PCEF a through the PCEF b1. The h-OCS sends credit re-authorization events only to the PCEF b2 and no credit re-authorization events are available on the PCEF a and PCEF b1. Thus, when an event that occurs matches a trigger event, the PCEF a, PCEF b1, and PCEF b2 may initiate an IP-CAN session modification process respectively. When an event that occurs matches a credit re-authorization event, however, only the PCEF b2 initiates a credit re-authorization process.

In this embodiment, the h-PCRF may send PCC rules to the PCEF a, PCEF b1, and PCEF b2 in three modes, which is similar to the first embodiment and is not further described.

The h-PCRF may also provide different PCC rule enforcement instructions for different PCEFs or provide different PCC rules according to the functions of different PCEFs. Multiple S9 interfaces may be available between the h-PCRF and the v-PCRF and correspond to different PCEFs such as a PCEF a or a PCEF b1. In addition, there may be only one S9 interface between the h-PCRF and the v-PCRF. The PCC rule message transmitted on the S9 interface carries the indication provided for the target PCEF.

The following describes the IP-CAN session modification process and the credit re-authorization process respectively.

If the h-PCRF sends a trigger event to the PCEF a through the v-PCRF, the PCEF a initiates an IP-CAN session modification process. In this case, the h-PCRF receives a PCC rule request message including the information of the trigger event that occurs and affected PCC rules from the PCEF a through the v-PCRF, generates new PCC rules, and then delivers the new PCC rules and the obtained information of the trigger event that occurs and affected PCC rules to the PCEF b2, while giving an instruction indicating that trigger event information is used to match a credit re-authorization event. To indicate that trigger event information is used to match a credit re-authorization event, the h-PCRF may:

add a trigger event type that is only used to match a credit re-authorization event when delivering the trigger event to the PCEF b2;

add a mark to the existing trigger event information to identify that the trigger event is used to update the trigger event stored on the PCEF b2 or match a credit re-authorization event; or use other methods. Then the PCEF b2 matches trigger event information received from the h-PCRF with the stored credit re-authorization event and determines whether to perform credit re-authorization according to the matching result. If credit re-authorization is required, the PCEF b2 performs credit re-authorization on all the affected PCC rules received from the h-PCRF.

Figure 7:
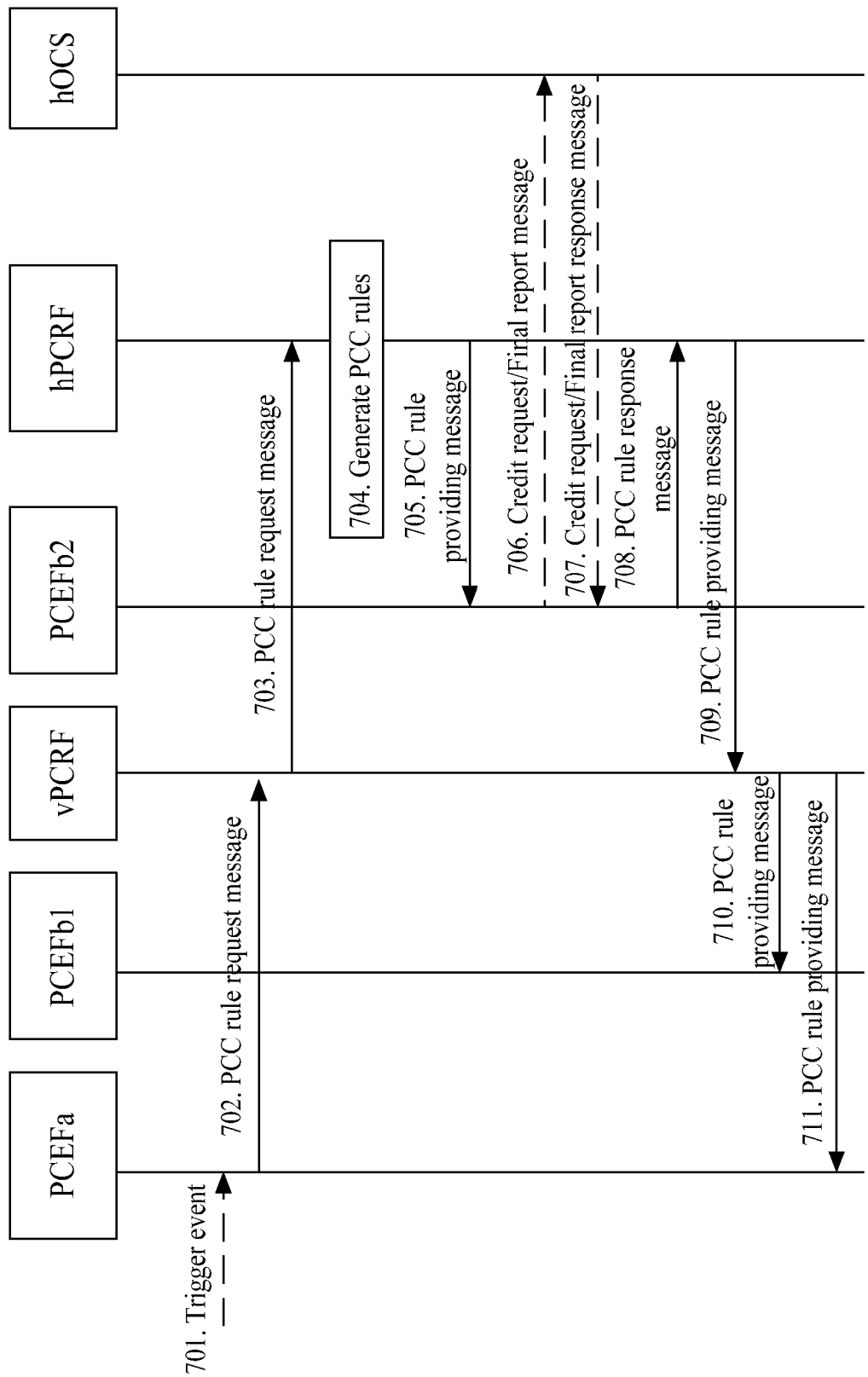
FIG. 7 is a flowchart showing that a PCEF a initiates an IP-CAN session modification process when an h-PCRF delivers a trigger event to the PCEF a through a v-PCRF in a third embodiment of the present invention.

FIG. 7 is a flowchart showing that a PCEF a initiates an IP-CAN session modification process when an h-PCRF delivers a trigger event to the PCEF a through a v-PCRF in the third embodiment of the present invention. The process includes the following steps:

Step 701: The PCEF a determines that an IP-CAN session modification process needs to be initiated to update PCC rules.

In this step, the PCEF a may determine whether to initiate an IP-CAN session modification process according to whether an event that matches the trigger event stored on the PCEF a or an internal trigger event occurs. The trigger event includes but is not limited to dedicated bearer setup, modification, and deletion initiated by a UE.

Step 702: The PCEF a sends a PCC rule request message to the v-PCRF, carrying the update information required for the h-PCRF to make PCC decisions.

Step 703: The v-PCRF forwards the received PCC rule request message, carrying the update information sent from the PCEF a or PCEF b1 and required for the h-PCRF to make PCC decisions.

Step 704: The h-PCRF generates PCC rules.

When generating PCC rules, the h-PCRF may interact with the AF or the SPR to obtain the required application layer service information or subscription data information.

Step 705: The h-PCRF sends a PCC rule providing message to the PCEF b2.

In this step, when sending the PCC rule providing message to the PCEF b2, the h-PCRF may also provide the received trigger event information and the information of the affected PCC rules from the PCEF a for the PCEF b2, while giving an instruction indicating that trigger event information is used to match a credit re-authorization event.

Step 706 and step 707: In online charging mode, the PCEF b2 determines whether to initiate a credit re-authorization process according to stored credit re-authorization event information and trigger event information in the PCC rule providing message.

In this step, the PCEF b2 matches stored credit re-authorization event information with trigger event information in the PCC rule providing message. If the matching is successful, the PCEF b2 initiates a credit re-authorization process and performs credit re-authorization on all the affected PCC rules received from the h-PCRF.

Step 708: The PCEF b2 returns a PCC rule response message to the h-PCRF. The response message may carry the enforcement result information of the PCC rules. In online charging mode, the response message may also carry credit availability information.

Step 709: The h-PCRF sends a PCC rule providing message to the v-PCRF according to the PCC rule response message sent from the PCEF b2.

In online charging mode, the PCC rule response message sent from the PCEF b to the h-PCRF may also carry credit availability information. If the credit is available, the h-PCRF sends a PCC rule providing message to the PCEF a, carrying new PCC rules. If the credit is unavailable, the h-PCRF sends a PCC rule providing message to the PCEF a, without carrying the new PCC rules generated for the unavailable credit.

Step 710: The v-PCRF sends a PCC rule providing message to the PCEF b1.

In this step, before sending the received PCC rule providing message to the PCEF b1, the v-PCRF may or may not process the message according to local policies.

Step 711: The v-PCRF sends a PCC rule providing message to the PCEF a.

In this step, the v-PCRF may or may not process the received PCC rule providing message according to local policies.

If the h-PCRF delivers a trigger event to the PCEF b2 and then the PCEF b2 sends the bearer-related trigger event to the PCEF a through the PCEF b1, the PCEF a may also initiate an IP-CAN session modification process. In this case, after detecting the trigger event, the PCEF a sends the information of the trigger event and affected PCC rules to the PCEF b2 through the PCEF b1; the PCEF b2 sends the received information to the h-PCRF to request new PCC rules; after receiving the new PCC rules from the h-PCRF, the PCEF b2 determines whether to initiate a credit re-authorization process according to the information received from the PCEF a and the new PCC rules received from the h-PCRF.

Figure 8:
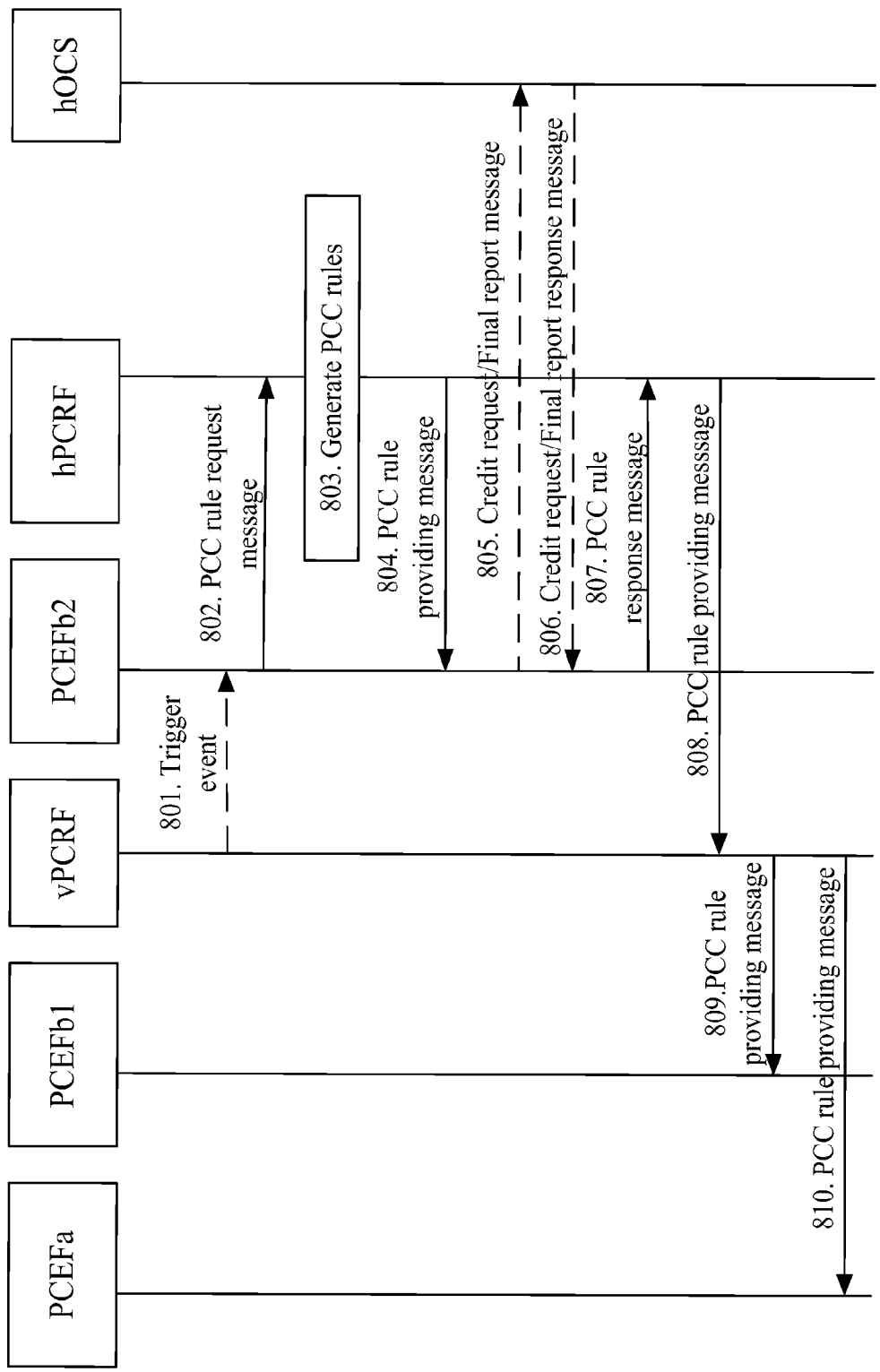
FIG. 8 is a flowchart showing that a PCEF b2 initiates an IP-CAN session modification process in the third embodiment of the present invention.

FIG. 8 is a flowchart showing that a PCEF b2 initiates an IP-CAN session modification process in the third embodiment of the present invention. The process includes the following steps:

Step 801: The PCEF b2 determines that an IP-CAN session modification process needs to be initiated to update PCC rules.

In this step, the PCEF b2 may determine whether to initiate an IP-CAN session modification process according to whether an event that matches the trigger event stored on the PCEF b2 or an internal trigger event occurs.

Step 802: The PCEF b2 sends a PCC rule request message to the h-PCRF, carrying the update information required for the h-PCRF to make PCC decisions.

Step 803: The h-PCRF generates PCC rules.

When generating PCC rules, the h-PCRF may interact with the AF or the SPR to obtain the required application layer service information or subscription data information.

Step 804: The h-PCRF sends a PCC rule providing message to the PCEF b2.

Step 805 and step 806: In online charging mode, the PCEF b2 determines whether to initiate a credit re-authorization process according to credit re-authorization event information and trigger event information in the PCC rule providing message.

In this step, according to stored credit re-authorization event information and the PCC rule providing message, the PCEF b2 needs to request a new credit from the h-OCS for a new charging key. For an unavailable charging key, the PCEF b2 returns a final report and remaining credits to the h-OCS. Other events meeting credit re-authorization conditions may also trigger the PCEF b2 to request new credits from the h-OCS.

Step 807: The PCEF b2 returns a PCC rule response message to the h-PCRF. The response message may carry the enforcement result information of the PCC rules. In online charging mode, the response message may also carry credit availability information.

Step 808: The h-PCRF sends a PCC rule providing message to the v-PCRF according to the PCC rule response message sent from the PCEF b2.

In online charging mode, the PCC rule response message sent from the PCEF b to the h-PCRF may also carry credit availability information. If the credit is available, the h-PCRF sends a PCC rule providing message to the PCEF a, carrying new PCC rules. If the credit is unavailable, the h-PCRF sends a PCC rule providing message to the PCEF a, without carrying the new PCC rules generated for the unavailable credit.

Step 809: The v-PCRF sends a PCC rule providing message to the PCEF b1.

In this step, before sending the received PCC rule providing message to the PCEF b1, the v-PCRF may or may not process the message according to local policies.

Step 810: The v-PCRF sends a PCC rule providing message to the PCEF a.

In this step, the v-PCRF may or may not process the received PCC rule providing message according to local policies.

Figure 9:
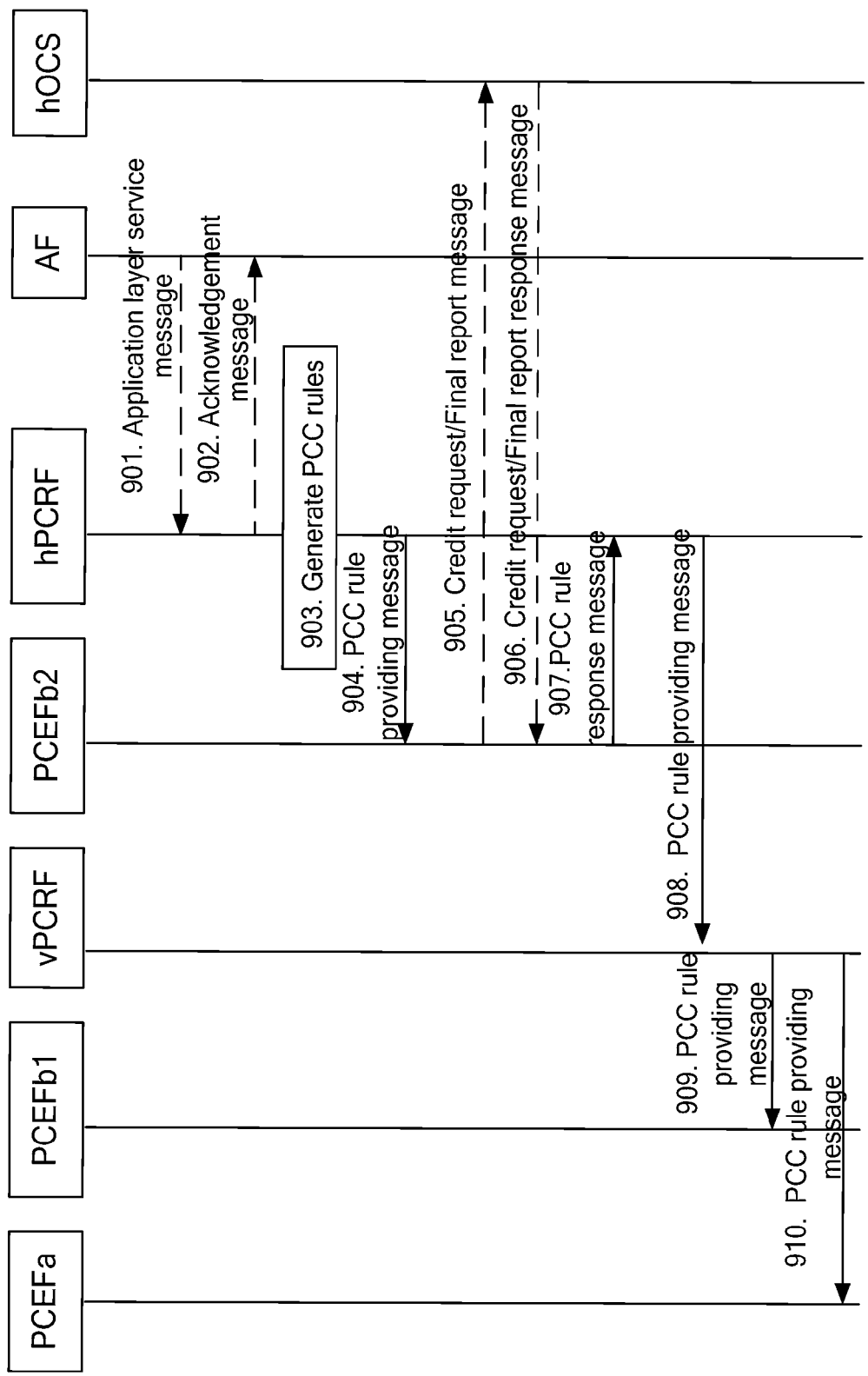
FIG. 9 is a flowchart showing that an h-PCRF initiates an IP-CAN session modification process in the third embodiment of the present invention.

FIG. 9 is a flowchart showing that an h-PCRF initiates an IP-CAN session modification process in the third embodiment of the present invention. The process includes the following steps:

Step 901: The AF sends an application layer service providing or modification message to the h-PCRF to trigger the h-PCRF to initiate an IP-CAN session modification process. The h-PCRF may also initiate an IP-CAN session modification process according to an internal trigger event.

Step 902: The h-PCRF returns an application layer service providing or modification acknowledgement message to the AF.

Step 903: The h-PCRF generates PCC rules.

Step 904: The h-PCRF sends a PCC rule providing message to the PCEF b2.

Step 905 and step 906: In online charging mode, the PCEF b2 determines whether to initiate a credit re-authorization process according to credit re-authorization event information and trigger event information in the PCC rule providing message.

In this step, according to stored credit re-authorization event information and the PCC rule providing message, the PCEF b2 needs to request a new credit from the h-OCS for a new charging key. For an unavailable charging key, the PCEF b2 returns a final report and remaining credits to the h-OCS. Other events meeting credit re-authorization conditions may also trigger the PCEF b2 to request new credits from the h-OCS.

Step 907: The PCEF b2 returns a PCC rule response message to the h-PCRF. The response message may carry the enforcement result information of the PCC rules. In online charging mode, the response message may also carry credit availability information.

Step 908: The h-PCRF sends a PCC rule providing message to the v-PCRF according to the PCC rule response message sent from the PCEF b2.

In online charging mode, the PCC rule response message sent from the PCEF b to the h-PCRF may also carry credit availability information. If the credit is available, the h-PCRF sends a PCC rule providing message to the PCEF a, carrying new PCC rules. If the credit is unavailable, the h-PCRF sends a PCC rule providing message to the PCEF a, without carrying the new PCC rules generated for the unavailable credit.

Step 909: The v-PCRF sends a PCC rule providing message to the PCEF b1.

In this step, before sending the received PCC rule providing message to the PCEF b1, the v-PCRF may or may not process the message according to local policies.

Step 910: The v-PCRF sends a PCC rule providing message to the PCEF a.

In this step, the v-PCRF may or may not process the received PCC rule providing message according to local policies.

Although the objective, technical solution, and merits of the present invention have been described in detail with reference to some exemplary embodiments, the invention is not limited to such embodiments. It is apparent that those skilled in the art may make various modifications and variations to the invention without departing from the spirit and scope of the invention. The invention is intended to cover the modifications and variations provided that they fall in the scope of protection defined by the following claims or their equivalents

The invention claimed is:

1. A method for session modification, comprising:
receiving, by a server configured with a home policy and charging rules function (the h-PCRF server), a policy and charging control (PCC) rule request message from an access gateway configured with a policy and charging enforcement function (PCEF a);
sending, by the h-PCRF server, a first PCC rule providing message to a packet data network gateway configured with an additional policy and charging enforcement function (PCEF b) according to the received PCC rule request message;
receiving, by the h-PCRF server, a PCC rule response message from the packet data network gateway; and
sending, by the h-PCRF server, a second PCC rule providing message to the access gateway according to the PCC rule response message.

2. The method of claim 1, before the step of receiving the PCC rule request message, further comprising:
sending, by the h-PCRF server, a trigger event to the access gateway and the packet data network gateway.

3. The method of claim 1, wherein the PCC rule request message includes information of an occurred trigger event, and information of PCC rules affected by the occurred trigger event;
the first PCC rule providing message includes information of the occurred trigger event, and information of PCC rules generated by the h-PCRF server; and the step of sending the first PCC rule providing message to the packet data network gateway comprises:
sending, by the h-PCRF server, the first PCC rule providing message to the packet data network gateway, for matching a credit re-authorization event.

4. The method of claim 1, before either of the sending steps, further comprising:
generating, by the h-PCRF server, corresponding PCC rules for each of the access gateway and packet data network gateway according to a function of the respective PCEF.

5. The method of claim 1, before the step of receiving the PCC rule response message from the packet data network gateway, further comprising:
receiving, by the packet data network gateway, the first PCC rule providing message;
sending, by the packet data network gateway, a credit request message to a home online charging system (the h-OCS);
receiving, by the h-OCS, the credit request message;
sending, by the h-OCS, a new online charging credit information or a final report response information to the packet data network gateway;
receiving, by the packet data network gateway, the new online charging credit information or the final report response information; and
sending, by the packet data network gateway, the PCC rule response message to the h-PCRF server.

6. The method of claim 5, wherein the PCC rule response message comprises credit availability information; and
the step of sending the second PCC rule providing message to the access gateway comprises:
sending, by the h-PCRF server, the second PCC rule providing message carrying new PCC rules to the access gateway if the credit is available; or
sending, by the h-PCRF server, the second PCC rule providing message without carrying the new PCC rules corresponding to the unavailable credit to the access gateway if the credit is unavailable.

7. The method of claim 5, wherein the credit request message to the h-OCS carries a final report to the h-OCS when the packet data network gateway detects that a credit re-authorization event matches the credit re-authorization event stored on the packet data network gateway.

8. The method of claim 7, wherein the receiving, by the packet data network gateway, the first PCC rule providing message occurs before the sending, by the packet data network gateway, the credit request message to the h-OCS;
wherein the first PCC rule providing message is received from the h-PCRF server, and carries information of an occurred trigger event on the access gateway and information of affected PCC rules; and
wherein the information of the occurred trigger event is used to match a credit re-authorization event.

9. The method of claim 1, wherein the PCC rule request message includes information of an occurred trigger event, and information of PCC rules affected by the occurred trigger event, and wherein the first PCC rule providing message includes information of the occurred trigger event, and information of the PCC rules affected by the occurred trigger event;
wherein the step of receiving the PCC rule request message comprises:
receiving, by a server configured with a visit policy and charging rules function (the v-PCRF server), the PCC rule request message from the access gateway; and
receiving, by the h-PCRF server, the PCC rule request message from the v-PCRF server; and wherein the step of sending the first PCC rule providing message to the packet data network gateway comprises:
sending, by the h-PCRF server, the first PCC rule providing message to the packet data network gateway for matching a credit re-authorization event.

10. The method of claim 9, before the step of receiving the PCC rule request message, further comprising:
sending, by the h-PCRF server, a trigger event to the access gateway through the v-PCRF server.

11. The method of claim 9, wherein the first PCC rule providing message further carries a trigger event type that is used to match a credit re-authorization event.

12. The method of claim 9, after the step of sending the first PCC rule providing message to the packet data network gateway, further comprising:
determining, by the packet data network gateway, whether the stored credit re-authorization event information matches with trigger event information in the first PCC rule providing message; and
initiating, by the packet data network gateway, a credit re-authorization process if the matching is successful.

13. The method of claim 1, wherein the PCC rule response message comprises credit availability information; and the step of sending the second PCC rule providing message to the access gateway comprises:
sending, by the h-PCRF server, the second PCC rule providing message carrying new PCC rules to the access gateway through a v-PCRF server if the credit is available; or
sending, by the h-PCRF server, the second PCC rule providing message without carrying the new PCC rules corresponding to the unavailable credit to the access gateway through a v-PCRF server if the credit is unavailable.

14. The method of claim 1, wherein the PCEF b comprises PCEF b1 and PCEF b2, and the PCC rule response message comprises credit availability information; and the method further comprises:
sending, by the h-PCRF server, the first PCC rule providing message carrying new PCC rules to the PCEF b1 through a v-PCRF server if the credit is available; or
sending, by the h-PCRF server, the first PCC rule providing message without carrying the new PCC rules generated for the unavailable credit to the PCEF b2 through a v-PCRF server if the credit is unavailable.

15. The method of claim 5, wherein the step of sending, by the h-OCS, the new online charging credit information or the final report response message to the packet data network gateway comprises:
sending, by the h-OCS, a credit response message which carries the new online charging credit information or the final report response information to the packet data network gateway.

16. The method of claim 5, wherein the credit request message to the h-OCS carries a final report to the h-OCS when a trigger event carried in the first PCC rule providing message received by the packet data network gateway matches the stored credit re-authorization event on the packet data network gateway.

17. The method of claim 5, wherein the credit request message to the h-OCS carries a final report to the h-OCS when the first PCC rule providing message carries a new charging key or an unavailable charging key.

18. The method of claim 1, wherein the access gateway is a serving gateway.

19. The method of claim 9, wherein the occurred trigger event information is used to match a credit re-authorization event, comprises:
the information of the occurred trigger event of the first PCC rule providing message further includes a mark to the occurred trigger event to identify that the occurred trigger event is used to update the trigger event stored on the packet data network gateway.

20. The method of claim 9, wherein the occurred trigger event information is used to match a credit re-authorization event, comprises:
the information of the occurred trigger event of the first PCC rule providing message further includes a mark to the occurred trigger event to identify that the occurred trigger event is used to match the credit re-authorization event.

21. A method for transferring information, comprising:
receiving, by a server configured with a home policy and charging rules function (the h-PCRF server), a policy and charging control (PCC) rule request message from an access gateway configured with a policy and charging enforcement function (PCEF a); wherein the PCC rule request message includes information of a trigger event that occurs on the access gateway and information of affected PCC rules;
obtaining, by the h-PCRF server, the information of the trigger event that occurs on the access gateway and the information of the affected PCC rules from the received PCC rule request message; and
sending, by the h-PCRF server, a PCC rule providing message to a packet data network gateway configured with an additional policy and charging enforcement function (PCEF b), where the PCC rule providing message comprises the information of the trigger event that occurs on the access gateway.

22. The method of claim 21, before the step of receiving the PCC rule request message from the access gateway, further comprising:
sending, by the h-PCRF server, the trigger event to the access gateway.

23. The method of claim 21, wherein the PCC rule providing message further comprises the information of affected PCC rules.

24. A system for session modification comprising:
a server configured with a home policy and charging rules function (the h-PCRF server), wherein the h-PCRF server is configured to be communicatively connected to an access gateway and a packet data network gateway, the access gateway being configured with a policy and charging enforcement function (PCEF a) and the packet data network gateway being configured with an additional policy and charging enforcement function (PCEF b); and
wherein the h-PCRF server is further configured to receive a policy and charging control (PCC) rule request message from the access gateway, to send a first PCC rule providing message to the packet data network gateway according to the received PCC rule request message, to receive a PCC rule response message from the packet data network gateway, and to send a second PCC rule providing message to the access gateway according to the PCC rule response message.

25. A system for session modification comprising:
a server configured with a home policy and charging rules function (the h-PCRF server);
wherein the h-PCRF server is configured to be communicatively connected to an access gateway and a packet data network gateway, the access gateway being configured with a policy and charging enforcement function (PCEF a) and the packet data network gateway being configured with an additional policy and charging enforcement function (PCEF b), and wherein the h-PCRF server is further configured to receive a policy and charging control (PCC) rule request message from the access gateway; wherein the PCC rule request message includes information of a trigger event that occurs on the access gateway and information of affected PCC rules, and configured to obtain the information of the trigger event that occurs on the access gateway and the information of the affected PCC rules from the received PCC rule request message, and to send a PCC rule providing message to the packet data network gateway, where the PCC rule providing message comprises the information of the trigger event that occurs on the access gateway.

26. A method for session modification, comprising:

receiving, by a server configured with a home policy and charging rules function (the h-PCRF server), a policy and charging control (PCC) rule request message from a first gateway configured with a policy and charging enforcement function (PCEF a);

sending, by the h-PCRF server, a first PCC rule providing message to a second gateway configured with an additional policy and charging enforcement function (PCEF b) according to the received PCC rule request message;

receiving, by the h-PCRF server, a PCC rule response message from the second gateway; and sending, by the h-PCRF server, a second PCC rule providing message to the first gateway according to the PCC rule response message.

27. A method for transferring information, comprising:

receiving, by a server configured with a home policy and charging rules function (the h-PCRF server), a policy and charging control (PCC) rule request message from a first gateway configured with a policy and charging enforcement function (PCEF a), wherein the PCC rule request message includes information of a trigger event that occurs on the first gateway and information of affected PCC rules;

obtaining, by the h-PCRF server, the information of the trigger event that occurs on the first gateway and the information of the affected PCC rules from the received PCC rule request message; and sending, by the h-PCRF server, a PCC rule providing message to a second gateway configured with an additional policy and charging enforcement function (PCEF b), where the PCC rule providing message comprises the information of the trigger event that occurs on the first gateway.

* * * * *